(12) United States Patent
Murakami et al.

(10) Patent No.: US 7,553,252 B2
(45) Date of Patent: Jun. 30, 2009

(54) DIFFERENTIAL UNIT WITH LIMITED SLIP DIFFERENTIAL MECHANISM

(75) Inventors: Mamoru Murakami, Tokyo (JP); Norio Owada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 230 days.

(21) Appl. No.: 11/449,644

(22) Filed: Jun. 9, 2006

(65) Prior Publication Data

US 2006/0281599 A1    Dec. 14, 2006

(30) Foreign Application Priority Data

Jun. 13, 2005    (JP)    ............... 2005-172975

(51) Int. Cl.
*F16H 48/20*    (2006.01)
(52) U.S. Cl. ............... 475/249; 475/150; 475/151; 475/153; 475/199; 475/204; 475/206
(58) Field of Classification Search ........... 475/248, 475/249, 199, 204, 206, 150, 151, 153, 293
See application file for complete search history.

(56) References Cited

U.S. PATENT DOCUMENTS

| | | | | |
|---|---|---|---|---|
| 4,718,303 A | * | 1/1988 | Fogelberg | 475/150 |
| 5,217,416 A | * | 6/1993 | Dick | 475/150 |
| 5,269,730 A | * | 12/1993 | Hirota | 475/150 |
| 5,373,912 A | * | 12/1994 | Haiki et al. | 180/249 |
| 6,612,956 B2 | * | 9/2003 | Fukuno et al. | 475/199 |
| 7,144,347 B2 | * | 12/2006 | Kushino | 475/249 |
| 7,276,010 B2 | * | 10/2007 | Kushino | 475/249 |
| 2006/0240935 A1 | * | 10/2006 | Yamazaki et al. | 475/249 |

FOREIGN PATENT DOCUMENTS

| | | |
|---|---|---|
| JP | 06-320973 | 11/1994 |
| JP | 2004-225716 | 8/2004 |

\* cited by examiner

*Primary Examiner*—David D. Le
(74) *Attorney, Agent, or Firm*—Smith, Gambrell & Russell LLP

(57) ABSTRACT

The differential unit with a limited slip differential mechanism of the present invention comprises a planetary gear mechanism for torque distribution of drive torque inputted to an input shaft from an engine between a front drive shaft and a rear drive shaft, and a multiple disc clutch for limiting differential rotation of the planetary gear mechanism, wherein, when a clutch plate receiving clutch engaging force applied to the multiple disc clutch is fixed to a side surface of a planetary carrier of the planetary gear mechanism, pins are formed on the ends of bolts for fixing the planetary carrier, and positioning and fixing is carried out by fitting the pins into check holes formed in the clutch plate.

19 Claims, 5 Drawing Sheets

DIFFERENTIAL UNIT WITH LIMITED SLIP DIFFERENTIAL MECHANISM

The disclosure of Japanese Patent Application No. 2005-172975 filed on Jun. 13, 2005, including the specification, drawings and abstract, is incorporated herein by reference in its entirety.

BACKGROUND OF THE INVENTION

1. Field of the Invention

The present invention relates to a differential unit with a limited slip differential mechanism provided with clutch plates for receiving clutch engaging force applied to a friction clutch member at a planetary carrier side surface.

2. Description of the Related Art

Conventionally, it is known to use a planetary gear mechanism as a center differential for a full-time four-wheel drive vehicle. There are also many instances in this type of center differential where a limited slip differential mechanism is provided for appropriately performing torque distribution by limiting differential action between front and rear wheels according to torque acting on the center differential.

For example, Japanese patent laid-open No. 2004-225716 discloses a differential unit provided with a torque sensing limited slip differential mechanism. With the technology disclosed in this document, a wet-type multiple disc clutch is provided as a friction clutch member at one side of a planetary carrier constituting the planetary gear mechanism, and by varying clutch engaging force for the wet-type multiple disc clutch according to input torque it is possible to suitably perform torque distribution to front and rear wheels.

Limited differential torque for limiting differential action of the differential unit in this manner is determined by the clutch engaging force for the friction clutch. As technology for engaging a friction clutch, it is common to have a structure where a pair of clutch plates are provided either side of the friction clutch, with one clutch plate being pressed against the other clutch plate and fastening the friction clutch between the two clutch plates, to cause rotation of the friction plate together with the two clutch plates.

In the case one clutch plate integrally formed in a ring gear may be divided from the ring gear. The clutch plate receiving clutch engaging pressure can be supported by the planetary carrier of the planetary gear mechanism so as to receive clutch engaging pressure in stead of the ring gear. But the clutch plate is provided between the planetary carrier and the other clutch plate, the clutch plate and the planetary carrier are rotated relative to each other, it is not possible to sufficiently limit differential action of the planetary gear mechanism.

SUMMARY OF THE INVENTION

An object of the present invention is to provide a differential unit with a limited slip differential mechanism that a clutch plate can be positioned and fixed to a planetary carrier with simple structure, that is easy to manufacture and assemble, and can achieve reduced manufacturing cost.

A differential unit with a limited slip differential mechanism of the present invention comprises a planetary gear mechanism for torque distribution of drive torque from an input shaft to a first output shaft and a second output shaft, and a friction clutch for limiting differential rotation of the planetary gear mechanism, a clutch plate arranged at a side surface of a planetary carrier for receiving clutch engaging force applied to the friction clutch, a positioning portion is formed on the clutch plate, and an engagement portion for engaging with the positioning portion is formed in a support member for supporting the planetary carrier.

According to the present invention, it can be handled simply with normal components provided in the planetary carrier and only processing areas provided on clutch plate side, which means that there is no need for dedicated components or special processes, and it is possible to position and fix the clutch plate to the planetary carrier easily, manufacture and assembly are simplified, and it is possible to reduce manufacturing costs.

The above and other objects, features and advantages of the invention will become more clearly understood from the following description referring to the accompanying drawings.

DETAILED DESCRIPTION OF THE PREFERRED EMBODIMENTS

Figure 1:
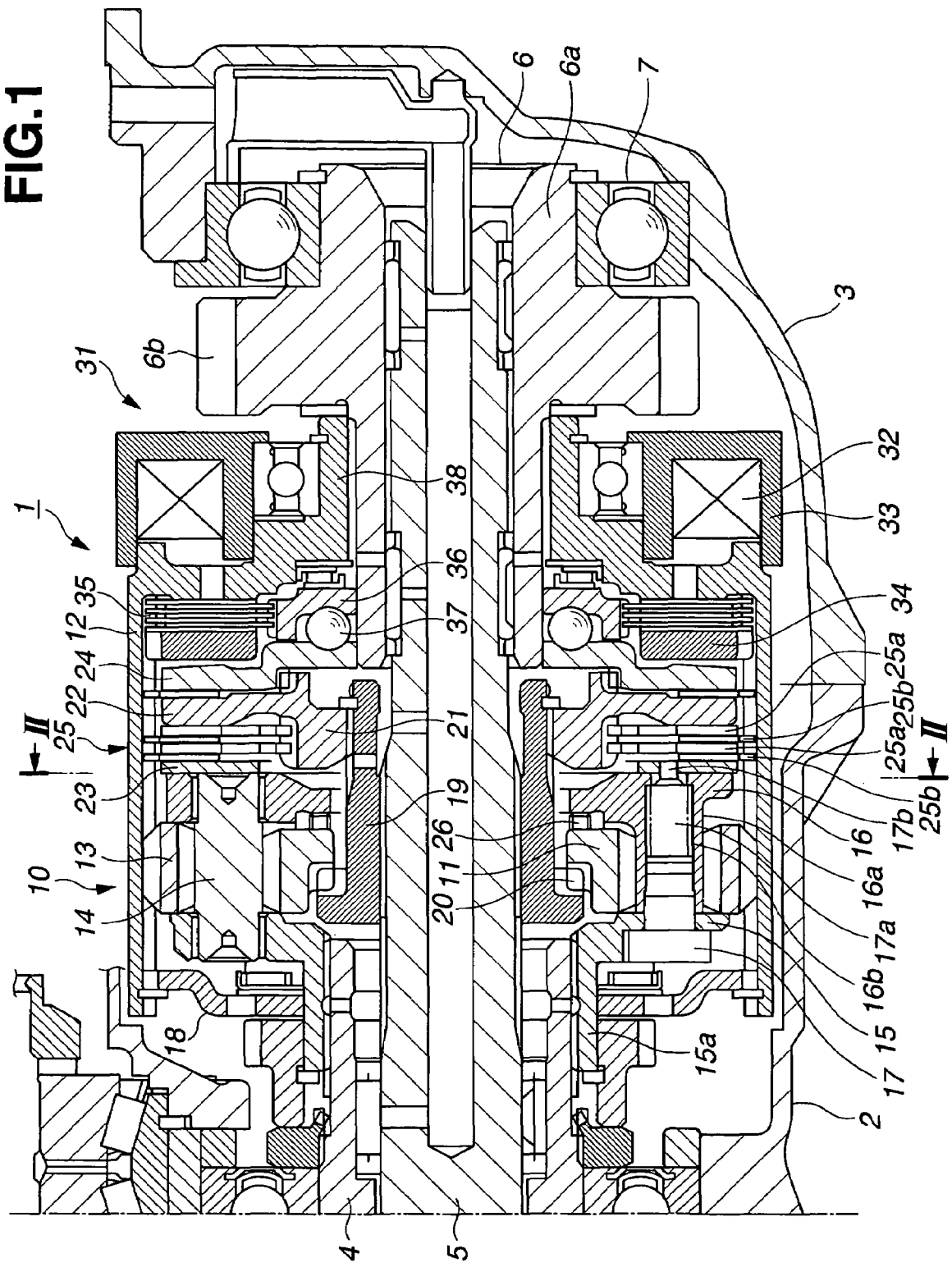
FIG. 1 is cross sectional drawing, equivalent to I-I in FIG. 2, along an axial direction of a center differential unit of a first embodiment.

One embodiment of the present invention will be described in the following based on the drawings.

First Embodiment

With this embodiment, a case where a differential unit with a limited slip differential mechanism is applied to a center differential will be used as an example. Accordingly, in the following description will be given with a center differential unit 1 in place of a differential unit with limited slip differential mechanism.

The center differential unit 1 is housed inside a transfer case 2 coupled to a rear part of a transmission case and an extension case 3, and an input shaft 15a of the center differential unit 1 is coupled to a rear end of a transmission output shaft 4 extending from a transmission, not shown.

Further, inside the transmission output shaft 4, a front drive shaft 5 is inserted and supported capable of relative rotation, as a first output shaft. A rear drive shaft 6, being a second output shaft, is rotatably supported via a bearing on, a rear part of the front drive shaft 5. A boss portion 6a is provided in a protruding manner on the rear part of the rear drive shaft 6, and a bearing 7 is fitted to the boss portion 6a. The boss portion 6a is rotatably supported in the extension case 3 via the bearing 7. A rear drive gear 6b formed on the rear drive shaft 6 is linked to a transfer shaft extending to a rear wheel side, via a reduction gear (not shown), and the transfer shaft is linked to a rear wheel shaft via a propeller shaft and a rear differential unit.

Also, a planetary gear mechanism 10 is arranged on the front drive shaft 5, between the transmission output shaft 4 and rear drive shaft 6, as a mechanism for absorbing differential action between front and rear wheels. The planetary gear mechanism 10 comprises a sun gear 11 as a second rotating member, a ring gear 13 arranged at the outer periphery of the sun gear 11, and a differential case 12 engaged to the outer periphery of the ring gear 13 and rotating together with the ring gear 13. Further, planetary pinions 14 are interposed between the sun gear 11 and the ring gear 13 as support members. A drum 38 provided in an electronically controlled limited slip differential unit 31, which will be described later, is integrally formed on the rear end of the differential case 12.

Figure 2:
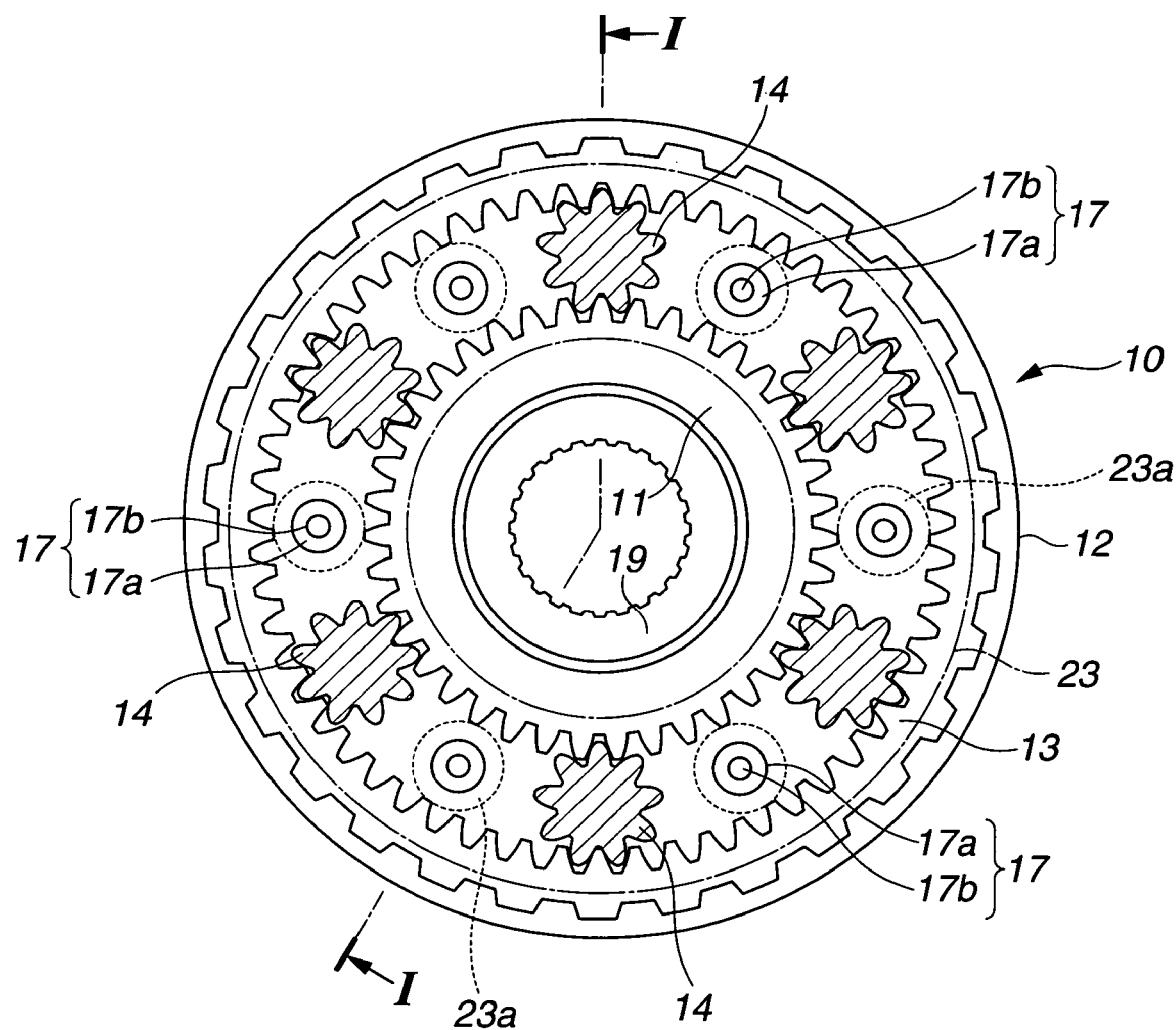
FIG. 2 is a cross sectional drawing equivalent to II-II in FIG. 1.

As shown in FIG. 2, with the embodiment planetary pinions 14 are provided at six places at equal intervals, and both ends of each planetary pinion 14 are rotatably supported via a bearing in front and rear planetary carriers 15, 16. Also, both of the planetary carriers 15, 16 are integrally joined by means of bolts 17 as support members, at sites that do not interfere with the planetary pinions 14. The peripheral structure of the bolts 17 will be described later.

Also, a boss portion 15a of the front planetary carrier 15 is engaged to a rear part of the transmission output shaft 4. The boss portion 15a also constitutes the input shaft 15a of the center differential unit 1 as described above. A support plate 18 is inserted into the outer periphery of the boss portion 15a, capable of rotation, and the outer periphery of the support plate 18 is engaged into the differential case 12.

A front output shaft 19 is also interposed between the inner periphery of the sun gear 11 and the front drive shaft 5. The inner periphery of the front output shaft 19 is spline fitted to the front drive shaft 5 so as to move backwards and forwards. Also, dogs 20 for transmitting torque are provided respectively engaging in engagement portions of the outer periphery of the front output shaft 19 and the inner periphery of the sun gear 11. The dogs 20 are comprised of cam teeth on the front output shaft 19 and cam teeth on the sun gear 11. If large input torque is applied to the sun gear 11 slip is generated between the cam teeth of the dogs 20 in the axial direction, and the front output shaft 19 moves to the left in FIG. 1.

The inner periphery of a clutch hub 21 is engaged with a rear part of the front output shaft 19. A rear clutch plate 22 is integrally formed on the clutch hub 21. On the other hand, a front clutch plate 23 is provided on a side surface of the rear planetary carrier 16.

A wet-type multiple disc clutch 25 is arranged as a friction clutch member between the front clutch plate 23 and the rear clutch plate 22. The wet-type multiple disc clutch 25 limits differential rotation of the planetary gear mechanism 10 by being engaged themselves, and is comprised of drive plates 25a that have inner peripheries splined to the clutch hub 21 and driven plates 25b that have outer peripheries splined to the differential case 12, arranged in an interleaved manner.

A pressure plate 24 is also spline fitted to a rear surface of the rear clutch plate 22 so as to rotate integrally with it. Further, the electronically controlled limited slip differential unit 31 is arranged behind the pressure plate 24. The configuration of the electronically controlled limited slip differential unit 31 is described in detail in Japanese patent laid-open No. Hei. 6-320973 previously filed by the present applicant.

Here a simple description will now be given of the configuration of the electronically controlled limited slip differential unit 31. The electronically controlled limited slip differential unit 31 has an electromagnet 33 accommodating an electromagnetic coil 32, a unit side pressure plate 34 having an outer periphery spline fitted to the differential case 12 is arranged in front of the electromagnet 33, and a clutch plate 35 is arranged between the electromagnet 33 and the unit side pressure plate 34.

The clutch plates 35 are made up of drive plates and driven plates arranged a specified distance apart in an interleaved manner, with the outer peripheries of the drive plates being spline fitted to the inner periphery of the differential case 12, and the inner peripheries of the driven plates being spline fitted to a clutch hub 36. Incidentally, reference numeral 38 is a drum supporting the electromagnet 33 via a bearing, and the drum 38 is spline fitted to and rotates integrally with the rear drive shaft 6. As described above, the differential case 12 is integrally formed with the drum 38.

The clutch hub 36 rotates with the rear drive shaft 6, and is externally mounted in a state where movement in the axial direction is restricted.

A cam ball 37 is also interposed between the clutch hub 36 and the pressure pate 24. Cam grooves for accommodating the cam ball 37 are formed in opposite surfaces of the clutch hub 36 and the pressure plate 24, and if differential rotation arises between the clutch hub 36 and the pressure plate 24 a cam thrust force TS is generated so as to press the pressure plate 24 forward.

If control current flows from a control unit, not shown, to the electromagnet coil 32 housed in the electromagnet 33, the electromagnet 33 is energized and the unit side pressure plate 34 is attracted, the clutch plate 35 interposed between the unit side pressure plate 34 and the electromagnet 33 is engaged, and the cam thrust force TS corresponding to the control current value is generated.

Incidentally, in the control unit, the cam thrust force TS on the pressure plate 24 is set based on values detected by various sensors for detecting vehicle behavior, such a wheel speed sensor for detecting rotation speed of each wheel, and a longitudinal acceleration sensor etc.

Figure 3:
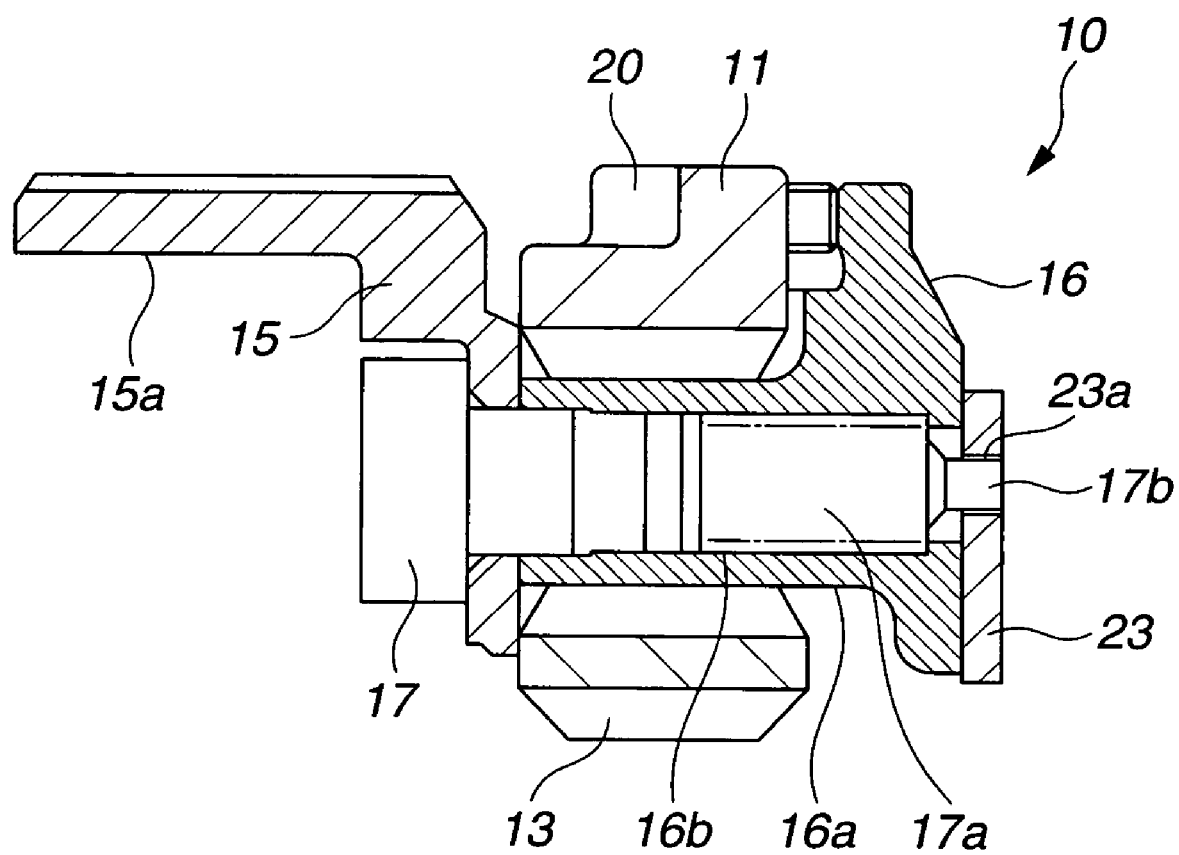
FIG. 3 is an enlarged cross sectional drawing of essential parts of a planetary gear mechanism.

Also, as shown in FIG. 3, threaded portions 17a of the bolts 17 for joining the planetary carriers 15, 16 are passed through from the front planetary carrier 15 and screwed into threaded holes 16b formed in the rear planetary carrier 16. These screw holes 16b are formed in boss portions 16a projected on a side surface of the rear planetary carrier 16. The boss portions 16a are provided between the sun gear 11 and the ring gear 13 at sites that do not interfere with the planetary pinions 14, and contact the front planetary carrier 15 at a tip end. By making the side surface of the front planetary carrier 15 contact the tips of the boss portions 16a, it is possible to keep the distance between the two planetary carriers 15, 16 constant.

Further, the screw portions 17a have pins 17b which are projected at the tip ends thereof and engage with the clutch plate. The pins 17b fit into check holes 23a formed in the front clutch plate 23 to fix a relative position. In a state where the pins 17b are fitted into the check holes 23a, the tip end surfaces of the pins 17b are either flush with the surface of the front clutch plate 23, or seated at positions slightly indented from the surface of the front clutch plate 23.

If the pins 17b projected at the tips of the bolts 17 are inserted into the check holes 23a of the front clutch plate 23, the front side clutch plate 23 is positioned and fixed to the side surface of the rear planetary carrier 16 in a state where rotation is restricted.

Next, operation of the present embodiment having the above structure will be described.

At traveling forward, the gears of the transmission are selected and shifted by a predetermined manner. When drive torque transmitted through the transmission output shaft 4 is inputted to the input shaft 15a of the center differential unit 1 coupled to the transmission output shaft 4, the planetary pinions 14 supported by the front planetary carrier 15 and the rear planetary carrier 16 are orbited by the rotation of the front planetary carrier 15 coupled to the input shaft 15a.

The planetary pinions 14 mesh with the sun gear 11 and the ring gear 13. Also, the sun gear 11 engages with the front output shaft 19 which is splined to the front drive shaft. The outer surface of the ring gear 13 splines to the inner surface of the differential case 12 rotates together with the ring gear 13. The hub 38 is integrally formed on a rear end of the differential case 12 and is splined to the rear drive shaft 6. The hub 38 constitutes one part of the electronically controlled limited slip differential unit 31.

Accordingly, by using these planetary pinions 14, drive torque outputted from the transmission output shaft is distributed to the sun gear 11 side and the ring gear 13 side at a distribution ratio (for example, front wheels 4: rear wheels 6) determined by the gear ratio of the sun gear 1 and the ring gear 13, and transmitted to the front and rear wheels to perform four-wheel drive travel.

Incidentally, the specifically distributed drive torque is transmitted to the sun gear 11 by the planetary gear mechanism 10, while on the other hand torque generated from the front drive shaft 5 due to resistance at traveling (running resistance, acceleration resistance etc.) is applied to the front output shaft 19 connected to the sun gear 11 by means of the dogs 20. Because of this, a transmission torque TF acting in the rotational direction and cam thrust torque TS acting in the axial direction are generated between cam teeth respectively meshing with the dogs 20 connecting the front output shaft 19 and the sun gear 11.

In this case, an end side surface in the axial direction of the sun gear 11 is supported via a bearing 26 in the rear planetary carrier 16, which means that movement of the sun gear 11 in the axial direction is restricted, and as a result slip arises between the cam teeth with the cam thrust force TS generated between the cam teeth of the dogs 20, and the front output shaft 19 is pressed and moves forward (to the left in FIG. 1) in response to drive torque and torque generated by running resistance. When the front output shaft 19 moves forward, the clutch hub 21 that is coupled to the rear end of the front output shaft 19 also moves forward. When the clutch hub 21 moves, the interleaved plates that are parts constituting the wet-type multiple disc clutch 25 are presses against the front clutch plate 23 by way of the rear clutch plate 22 integrally formed with the clutch hub 21, and limited differential torque (clutch engaging force) is generated.

When limited differential torque is generated in the wet-type multiple disc clutch 25, the torque path between the differential case 12, connected to the rear drive shaft 6 via a drum 38, and the clutch hub 21 connected to the front drive shaft 5 via the front output shaft 19 is bypassed by means of the wet-type multiple disc clutch 25. As a result, a fixed rate torque transition is occurred between the front drive shaft 5 and the rear drive shaft 6 through the torque path formed in the wet-type multiple disc clutch 25 from one drive shaft of high rotational speed (NF or NR) to the other drive shaft of low rotational speed (NF or NR). Incidentally, it is possible to appropriately set the limited differential torque (clutch engaging force) generated in the wet-type multiple disc clutch 25 according to one or both of the number of plates constituting the wet-type multiple disc clutch 25 and the angle of dog teeth of the dogs 20.

On the other hand, when an engine brake torque inputs to the input shaft 15a of the center differential unit 1 from the transmission output shaft 4 in coasting travel, limited differential torque (clutch engaging torque) is generated in the wet-type multiple disc clutch 25, and a torque path between the rear drive shaft 6 and the front drive shaft 5 is bypassed as description above.

As a result, a fixed rate torque transition is occurred between the rear drive shaft 6 and the front drive shaft 5 through the torque path from one drive shaft of high rotational speed to the other drive shaft of low rotational speed.

Incidentally, when one of the front or rear wheels skids when starting or traveling on a low frictional road (low μ road), such as snow-covered road, limited slip of the wet-type multiple disc clutch 25 barely acts and road surface grip force is lowered considerably. Because torque arising due to resistance at traveling (running resistance, acceleration resistance etc.) is low, and so cam thrust force TS generated between cam teeth of the dogs 20 provided between the sun gear 11 and the front output shaft 19 is small.

In this type of situation, the electronically controlled limited slip differential unit 31 actively limits differential action between the front and rear wheels. The electronically controlled limited slip differential unit 31 has respective vehicle wheel speed sensors for detecting rotational speed (vehicle wheel speed) of each vehicle wheel, and in the event that vehicle wheel slip is detected by each of the vehicle wheel sensors the wet-type multiple disc clutch 25 is operated to engage and differential action to front and rear wheels is limited.

In this manner, with this embodiment, it is possible to suppress slip and to obtain favorable driving performance by operating the electronically controlled limited slip differential unit 31 to limit active differential action, even when starting or traveling on a low μ road surface such as snow-covered road in a region where it is not possible to operate and engage the wet-type multiple disc clutch 25 by the dogs 20 can.

Incidentally, clutch engaging force when the wet-type multiple disc clutch 25 is operated to engage by the dogs 20 or the electronically controlled limited slip differential unit 31 is borne by the front clutch plate 23. The front clutch plate 23 is positioned and fixed by fitting the pins 17b projected at the tips of the bolts 17 for coupling the rear planetary carrier 16 and the front planetary carrier 15 into the check holes 23a formed in the front clutch plate 23. Accordingly, when the front clutch plate 23 bears the clutch engaging force, there is no relative rotation between the front clutch plate 23 and the rear planetary carrier 16, and it possible to cause the front clutch plate 23 and the rear planetary carrier 16 to rotate together normally.

Also, the front clutch plate 23 is positioned and fixed to the rear planetary carrier 16 using the pins 17b projecting on the bolts 17, which means that it is possible for the bolts 17 to function as pilot bolts. Accordingly, there is no need to fix the rear planetary carrier 16 to the front clutch plate 23 using dedicated bolts or knock pins, as is the case with the related art. As a result, processing of the front clutch plate 23 becomes easy, and besides the reduction in manufacturing cost can be realized by reducing the number of components. Further, the rear planetary carrier 16 can directly adopt any of the conventional processes which means that manufacturing and assembly processes do not become complicated, and more significant reduction in cost can be performed.

Figure 4:
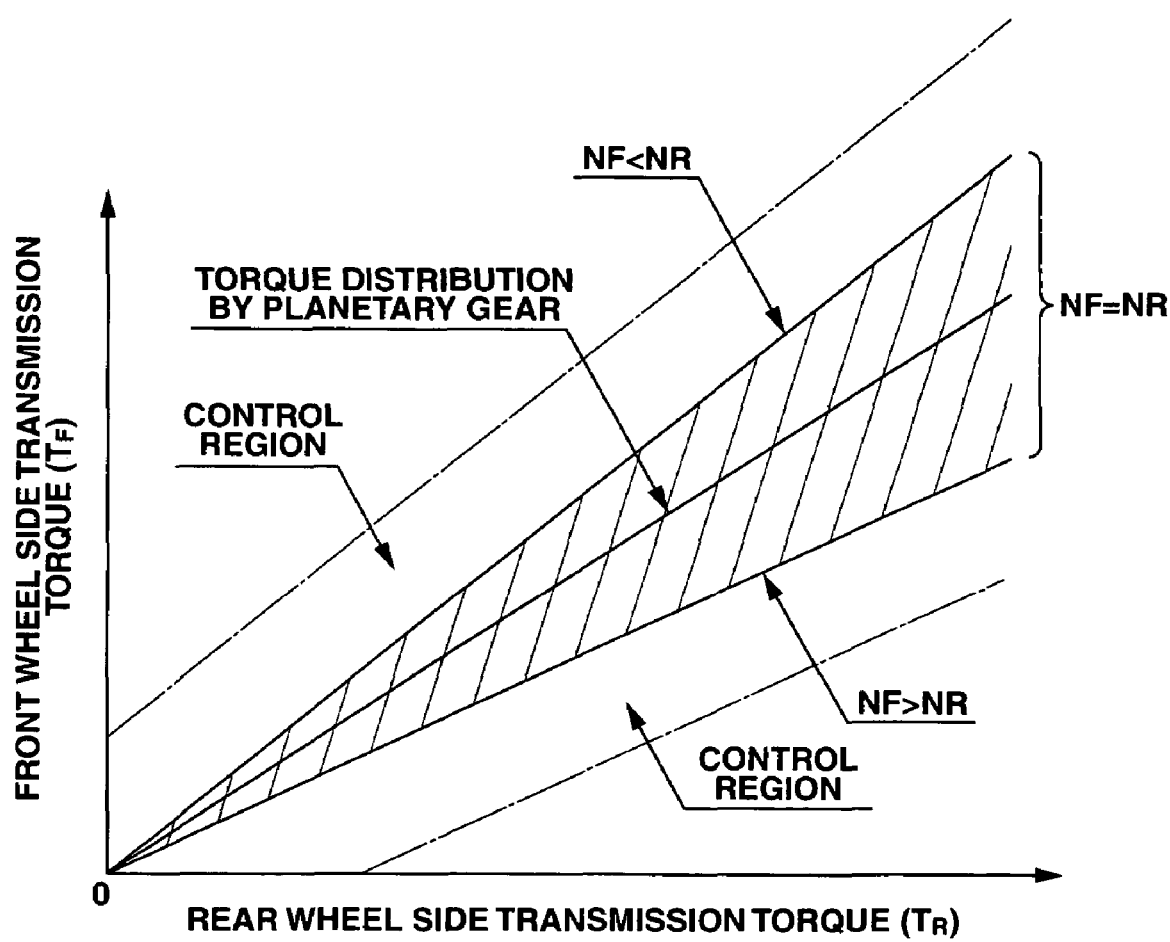
FIG. 4 is an explanatory drawing showing a limited differential torque characteristic.

Next, a relationship between front wheel rotation speed NF and rear wheel rotation speed NR, and front wheel transmission torque TF and rear wheel transmission torque TR, will be described using the characteristic drawing shown in FIG. 4.

When front wheel rotation speed NF and rear wheel rotation speed NR are equal and there is no transmission by the wet-type multiple disc clutch 25, then as shown by the solid lines in the center of the drawing, the front wheel transmission torque TF and the rear wheel transmission torque TR are set with at torque distribution set using the planetary gear mechanism 10.

On the other hand, in a state where the front wheel rotational speed NF is larger than the rear wheel rotational speed NR, since the wet-type multiple disc clutch 25 is engaged, the differential action is limited. Some of the drive torque transmitted to the front wheels is transmitted to the rear wheels, and the rear wheel transmission torque TR is increased.

Also, in a state where the rear wheel rotational speed NR is larger than the front wheel rotational speed NF, since the wet-type multiple disc clutch 25 is engaged, the differential action is limited. Some of the drive torque transmitted to the rear wheels is transmitted to the front wheels, and the front wheel transmission torque TF is increased.

Further, in a region where engaging force of the wet-type multiple disc clutch 25 exceeds limits and there is slip of the front wheels or rear wheels, and in a region where there is slip of the front wheels or rear wheels in a region where the front wheel transmission torque TF and the rear wheel transmission torque TR are small and limited slip force due to the dogs 20 is small, an operating region of the electronically controlled limited slip differential unit 31 is set as shown by the alternate long and short dash lines in the drawing, and by engaging the wet-type multiple disc clutch 25 in these regions it is possible to control slip generated when starting or traveling on a low μ road surface, for example.

In this manner, in an operating range where it is not possible to limit differential action of the front and rear wheels by the dogs 20, slip at starting or traveling on a low μ road surface can be suppressed by operating the electronically controlled limited slip differential unit 31 to limit active differential action.

Also, the dogs 20 will be operated the instant differential rotation occurs between the front wheel rotational speed NF and the rear wheel rotational speed NR. If the dogs 20 are operated, cam thrust force TS is generated at the cam teeth of the dogs 20, and limited differential torque (clutch engaging force) is generated in the wet-type multiple disc clutch 25 by the cam thrust force TS. Operation of the dogs 20 has good responsiveness compared to the control operation of the electronically controlled limited slip differential unit 31, it is possible to supplement a region that can not be controlled by the electronically controlled limited slip differential unit 31, and favorable driving performance as a whole can be obtained.

Second Embodiment

Figure 5:
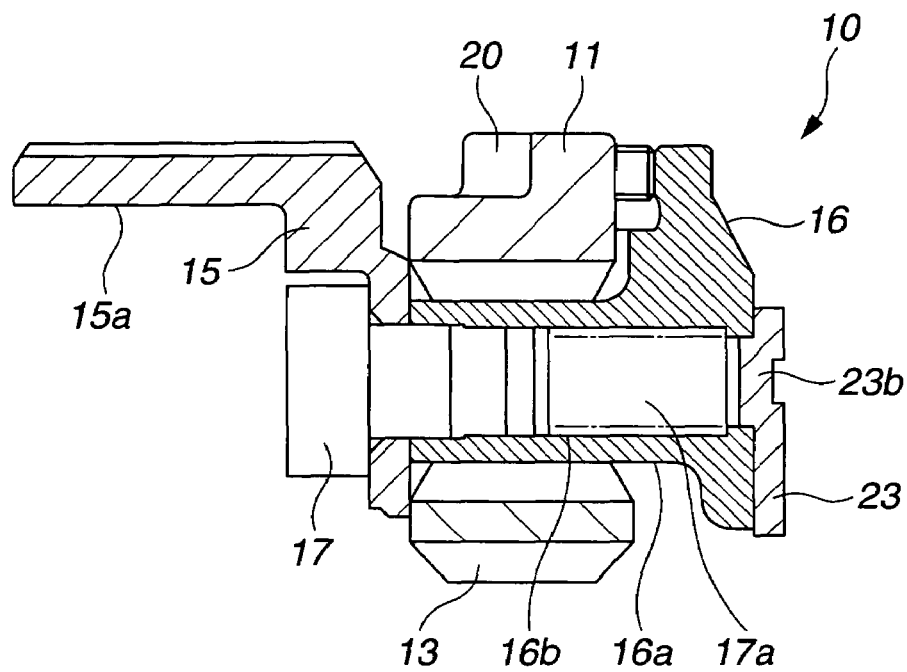
FIG. 5 is a cross sectional drawing, equivalent to FIG. 3, of a second embodiment.

A second embodiment is shown in FIG. 5. This embodiment is a modified example of the first embodiment, and peripheral parts that are not shown are common to the first embodiment. Also, in the drawing, structural components that are common to the first embodiment have the same reference numerals attached thereto, and their description is omitted.

With the above described first embodiment, in order to cause the bolts 17 to function as pilot bolts, pins 17b are formed on their tip ends, and by fitting the pins 17b into check holes 23a formed in the front clutch plate 23, the front clutch plate 23 is positioned and fixed to the rear planetary carrier 16.

With this embodiment however, the bolts 17 are normal standard components, projecting portions 23b used for positioning, are formed on the front clutch plate 23 as positioning portions, and are inserted into threaded holes 16b formed as hole portions in the rear planetary carrier 16. Accordingly, with this embodiment the screw holes 16b function as engagement portions.

According to this embodiment, standard components can be used for the bolts 17, and so they can be purchased cheaply. Also, the positioning projections 23b can be integrally formed when manufacturing the front clutch plate 23, which means there is no significant increase in manufacturing cost. As a result, it is possible to more significantly reduce total manufacturing cost.

Third Embodiment

Figure 6:
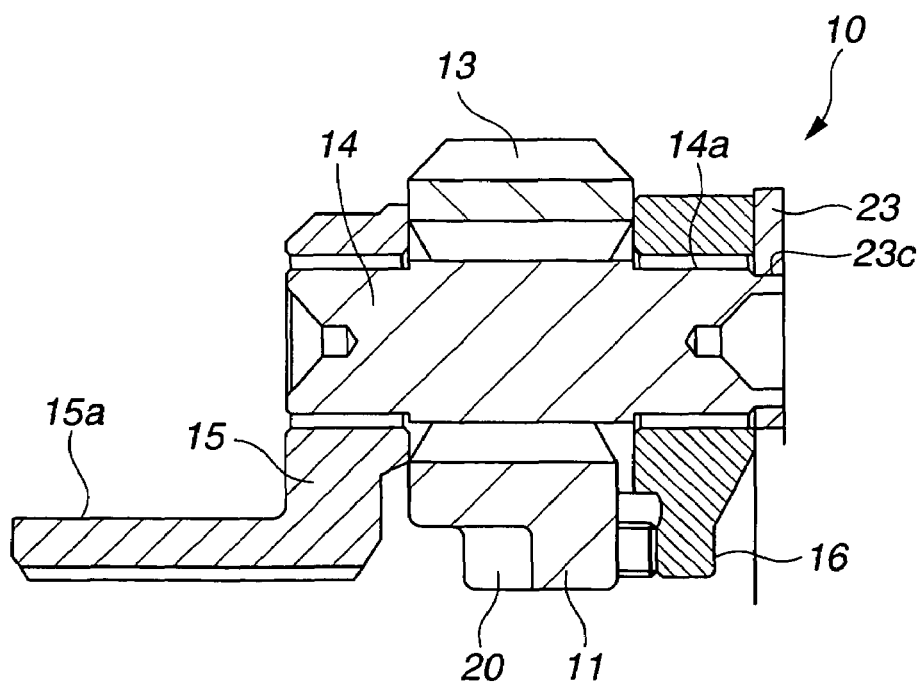
FIG. 6 is an enlarged cross sectional drawing around a planetary pinion of a third embodiment.

A third embodiment is shown in FIG. 6. This embodiment is a modified example of the first embodiment, and peripheral parts that are not shown are common to the first embodiment. Also, in the drawing, structural components that are common to the first embodiment have the same reference numerals attached thereto, and their description is omitted.

With this embodiment, one end of a shaft portion 14a rotatably supported at the rear planetary carrier 16 is extended and projects slightly from the rear carrier 16, and the extending portion of the shaft portion 14a is made to function as an engagement portion. Also, instead of the check holes 23a of the first embodiment and the positioning projections 23b of the second embodiment described above, check holes 23c are formed in the front clutch plate 23 as positioning members that can be fitted around and rotatably support the shaft portions 14a.

Also, by fitting the check holes 23c formed in the front clutch plate 23 around the shaft portion 14a of the planetary pinion 14 projecting from the rear planetary carrier 16, the front clutch plate 23 is positioned on the rear planetary carrier 16.

Accordingly, with this embodiment it is possible to use standard components for the bolts 17. Also, since positioning and fixing is performed with the comparatively large diameter shaft portion 14a of the planetary pinion 14, there is no need to axially support all of the planetary pinion 14. For example, in the case of six planetary pinions 14 being arranged, it is possible for every other one (that is 3) of the shaft portions 14a of the planetary pinions 14 to be extended, and for the check holes 23c formed in the front clutch plate 23 to be fitted around and rotatably support these extending portion.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A differential unit with a limited slip differential mechanism, comprising:
   a planetary gear mechanism for torque distribution of drive torque from an input shaft to a first output shaft and a second output shaft, wherein said planetary gear mechanism includes a sun gear, a ring gear, at least one planetary pinion, and a planetary carrier holding the planetary pinion;
   a friction clutch for limiting differential rotation of the planetary gear mechanism, said friction clutch including a first clutch component and a second clutch component, and wherein said first clutch component is drivingly connected to the ring gear and said second clutch component is drivingly connected to the sun gear when said friction clutch is in a disengaged state;
   a clutch plate for receiving clutch engaging force applied to the friction clutch;
   a positioning portion formed in the clutch plate; and
   an engagement portion formed on the planetary carrier for engaging with the positioning portion.

2. The differential unit with the limited slip differential mechanism of claim 1, wherein the positioning portion is a check hole formed in the clutch plate and the engagement portion is a pin provided on a tip end of a bolt, which bolt constitutes a component of the planetary carrier.

3. The differential unit with the limited slip differential mechanism of claim 1, wherein the positioning portion is a check hole formed in the clutch plate and the engagement portion is a shaft penetrating the planetary pinion.

4. The differential unit with the limited slip differential mechanism of claim 1, wherein the clutch plate is arranged at an axial side of the planetary carrier.

5. The differential unit with the limited slip differential mechanism of claim 1, wherein the clutch plate is in contact with the planetary carrier.

6. The differential unit with the limited slip differential mechanism of claim 1, wherein the first clutch component of said friction clutch comprises a first clutch component friction plate and the second clutch component of said friction clutch comprises a second clutch component friction plate.

7. The differential unit of claim 1 further comprising an electromagnetic clutch for adjusting said friction clutch from the disengaged state to an engaged state.

8. The differential unit of claim 1 wherein one of said first and second output shafts is axially adjustable and comprises a dog member in rotative driving engagement with said sun gear.

9. The differential unit with the limited slip differential mechanism of claim 1 wherein said first clutch component comprises a set of first clutch component friction plates and the second clutch component comprises a set of second clutch component friction plates, and said clutch plate for receiving the clutch engaging force applied to the friction clutch is placed in contact with one of said clutch component friction sets when the friction clutch is in an engaged state.

10. The differential unit with the limited slip differential mechanism of claim 9 wherein said friction clutch is a wet-type multiple disc clutch.

11. The differential unit with the limited slip differential mechanism of claim 1, wherein the planetary carrier includes a front planetary carrier member, a rear planetary carrier member and a support member for supporting said front planetary carrier member and said rear planetary carrier member, and the engagement portion is formed on said support member.

12. The differential unit with the limited slip differential mechanism of claim 11, wherein the planetary carrier further includes a boss portion projected on one of the front planetary carrier member and the rear planetary carrier member, and said boss portion is located between the sun gear and the ring gear so as not to contact with the planetary pinion, and the support member passes through the boss portion.

13. A differential unit with a limited slip differential mechanism, comprising:
a planetary gear mechanism for torque distribution of drive torque from an input shaft to a first output shaft and a second output shaft, said planetary gear mechanism comprising a planetary carrier;
a friction clutch for limiting differential rotation of the planetary gear mechanism;
a clutch plate for receiving clutch engaging force applied to the friction clutch;
a positioning portion formed on the clutch plate; and
an engagement portion formed in the planetary carrier for engaging with the positioning portion,
wherein the positioning portion is a projection formed on the clutch plate, and the engagement portion for engaging with the projection is a hole formed in the planetary carrier.

14. The differential unit with the limited slip differential mechanism of claim 13, wherein the friction clutch includes a first clutch component and a second clutch component, and wherein said planetary gear mechanism comprises a ring gear and a sun gear, and wherein said first clutch component is drivingly connected to the ring gear and said second clutch component is drivingly connected to the sun gear when the first clutch and second clutch components are disengaged from each other.

15. The differential unit with the limited slip differential mechanism of claim 13, wherein the clutch plate is arranged at an axial side of the planetary carrier.

16. The differential unit with the limited slip differential mechanism of claim 13, wherein the clutch plate is in contact with the planetary carrier.

17. The differential unit with the limited slip differential mechanism of claim 13, wherein the planetary carrier includes a front planetary carrier member, a rear planetary carrier member, a support member for supporting said front planetary carrier member and said rear planetary carrier member, and a boss portion projected on one of the front planetary carrier member and the rear planetary carrier member, and wherein said planetary gear mechanism includes a sun gear, a ring gear, at least one planetary pinion, and the planetary carrier holding the planetary pinion, and said boss portion is located between the sun gear and the ring gear so as not to contact with the planetary pinion, and the support member passes through the boss portion.

18. The differential unit with the limited slip differential mechanism of claim 13, wherein the planetary carrier includes a front planetary carrier member, a rear planetary carrier member and a support member for supporting said front planetary carrier member and said rear planetary carrier member, and said support member is inserted into the hole formed in the planetary carrier.

19. The differential unit of claim 13 further comprising an electromagnetic clutch for adjusting said friction clutch from the disengaged state to an engaged state.

* * * * *